(12) United States Patent
Amer et al.

(10) Patent No.: US 10,979,704 B2
(45) Date of Patent: Apr. 13, 2021

(54) METHODS AND APPARATUS FOR OPTICAL BLUR MODELING FOR IMPROVED VIDEO ENCODING

(71) Applicants: ATI Technologies ULC, Markham (CA); Advanced Micro Devices, Inc., Sunnyvale, CA (US)

(72) Inventors: Ihab M. A. Amer, Stouffville (CA); Khaled Mammou, Thornhill (CA); Vladyslav S. Zakharchenko, Kyiv (UA); Dmytro U. Elperin, Kyiv (UA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 843 days.

(21) Appl. No.: 14/702,876

(22) Filed: May 4, 2015

(65) Prior Publication Data

US 2016/0330469 A1 Nov. 10, 2016

(51) Int. Cl.
*H04N 19/513* (2014.01)
*H04N 19/184* (2014.01)
*H04N 19/172* (2014.01)
*H04N 19/105* (2014.01)
*H04N 19/70* (2014.01)
*H04N 19/14* (2014.01)
*H04N 19/17* (2014.01)

(52) U.S. Cl.
CPC ........... *H04N 19/105* (2014.11); *H04N 19/14* (2014.11); *H04N 19/17* (2014.11); *H04N 19/70* (2014.11)

(58) Field of Classification Search
CPC .. H04N 19/513; H04N 19/172; H04N 19/184; H04N 19/105; H04N 19/17; H04N 19/14; H04N 19/70

USPC ..................................................... 375/240.16
See application file for complete search history.

(56) References Cited

U.S. PATENT DOCUMENTS

| 6,111,582 A * | 8/2000 | Jenkins | G06T 15/20 |
| | | | 345/421 |
| 9,418,316 B1 * | 8/2016 | Liu | G06K 9/3258 |

(Continued)

FOREIGN PATENT DOCUMENTS

| KR | 10-2011-0126691 A | 11/2011 |
| WO | 2010/102913 A1 | 9/2010 |

OTHER PUBLICATIONS

Korean Intellectual Property Office, International Search Report and Written Opinion for PCT Application No. PCT/US2016/030753 (related to above-captioned patent application), dated Aug. 12, 2016.

*Primary Examiner* — Mainul Hasan
(74) *Attorney, Agent, or Firm* — Faegre Drinker Biddle & Reath LLP (57) ABSTRACT

Methods and apparatus of generating a refined reference frame for inter-frame encoding by applying blur parameters to allow encoding of image frames having blurred regions are presented herein. The methods and apparatus may identify a blurred region of an image frame by comparing the image frame with a reference frame, generate a refined reference frame by applying the blur parameter indicative of the blurred region to the reference frame, determine whether to use one of the reference frame and refined reference frame to encode the image frame, and encode the image frame using the refined reference frame when determined to use the refined reference frame.

20 Claims, 6 Drawing Sheets

(56) References Cited

U.S. PATENT DOCUMENTS

| | | | |
|---|---|---|---|
| 2005/0207492 A1* | 9/2005 | Pao | H04N 19/139 375/240.16 |
| 2005/0213661 A1* | 9/2005 | Xiang | G06T 7/223 375/240.16 |
| 2005/0276448 A1* | 12/2005 | Pryor | B60K 35/00 382/103 |
| 2006/0171569 A1* | 8/2006 | Budagavi | H04N 19/51 382/107 |
| 2008/0170124 A1* | 7/2008 | Hatanaka | H04N 5/23248 348/208.4 |
| 2008/0247462 A1* | 10/2008 | Demos | H04N 19/597 375/240.03 |
| 2008/0247467 A1* | 10/2008 | Rusanovskyy | H04N 7/12 375/240.16 |
| 2008/0253676 A1* | 10/2008 | Oh | G06T 5/003 382/255 |
| 2008/0259176 A1* | 10/2008 | Tamaru | H04N 5/23232 348/222.1 |
| 2009/0290637 A1* | 11/2009 | Lai | H04N 19/573 375/240.02 |
| 2010/0098345 A1* | 4/2010 | Andersson | H04N 19/85 382/238 |
| 2010/0278267 A1* | 11/2010 | Lai | H04N 19/117 375/240.16 |
| 2010/0309987 A1* | 12/2010 | Concion | H04N 5/772 375/240.26 |
| 2011/0102553 A1* | 5/2011 | Corcoran | G06K 9/00281 348/50 |
| 2011/0110431 A1* | 5/2011 | Laroche | H04N 19/139 375/240.16 |
| 2011/0229049 A1 | 9/2011 | Kondo | |
| 2011/0292997 A1* | 12/2011 | An | H04N 19/521 375/240.03 |
| 2013/0064302 A1* | 3/2013 | Koh | H04N 19/51 375/240.16 |
| 2013/0156092 A1* | 6/2013 | Li | H04N 19/115 375/240.01 |
| 2013/0222621 A1* | 8/2013 | Tokunaga | H04N 5/23293 348/208.1 |
| 2013/0300856 A1* | 11/2013 | Paul | G06T 5/003 348/83 |
| 2014/0307044 A1* | 10/2014 | Sharma | H04N 5/23229 348/36 |
| 2016/0057338 A1* | 2/2016 | Chen | H04N 5/23212 348/345 |

\* cited by examiner

METHODS AND APPARATUS FOR OPTICAL BLUR MODELING FOR IMPROVED VIDEO ENCODING

FIELD OF THE DISCLOSURE

The disclosure relates generally to video encoding and decoding, and more particularly, generating refined reference frames for improved compression of blurred regions of an image frame.

BACKGROUND

Image frames are often compressed through a coding scheme to reduce the amount of data transmitted in video systems. A video codec is a device or firmware/software program that enables video compression and/or decompression for digital video. In regions of video with motion, a number of pixels change from one image frame to the next, and the video compression scheme must send more data to keep up with the larger number of pixels that are changing. In extreme cases of high-frequency detail changes, the video quality may decrease. In order to maintain video quality, yet reduce the amount of data that is transmitted, various different compression techniques have been developed. For example, MPEG-based video compression typically operates on groups of pixels called macroblocks. Macroblocks are compared from one image frame to the next image frame, and the video compression codec sends only the differences within those macroblocks. Areas of video that have no motion thus require very little transmitted data.

Prediction techniques are also used in video compression systems to enable efficient encoding. The temporal prediction technique used in MPEG video is based on motion estimation. Motion estimation is based on the premise that, in most cases, consecutive image frames will be similar except for changes caused by objects moving within the frames. A motion vector is the key element in the motion estimation process. The motion vector is used to represent a macroblock in a frame based on the position of the macroblock (or a similar one) in another image frame, called the reference frame. The H.264/MPEG-4 AVC standard defines a motion vector as a two-dimensional vector used for inter prediction that provides an offset from the coordinates in the decoded image frame to the coordinates in a reference frame. In general, motion estimation is the process of determining the motion vectors that describe the transformation from one image frame to another image frame, where the image frames are usually adjacent in a video sequence. Motion vectors may relate to the whole image (global motion estimation) or specific parts, such as rectangular blocks, arbitrary shaped patches or even individual pixels. The motion vectors may be represented by a translational model or other models that can approximate the motion of a real video recording system.

Applying the motion vectors to an image frame to synthesize the transformation to the next image frame is called motion compensation. The combination of motion estimation and motion compensation is a key part of the video compression method used by many video codecs.

Natural video content, such as movie scenes captured by professional video shooters, typically has substantial camera pans and depth of field effects, which result in blurring of regions in an image frame. Since there is a discrepancy between blurred regions in an image frame and typically sharp regions in a reference frame, a typical video encoder encodes blurred regions using intra-frame coding rather than using inter-frame prediction. However, a major drawback with intra-frame coding is that it cannot leverage information from neighboring frames to encode the current frame, and is typically less efficient than using inter-frame prediction.

What is needed is a mechanism to allow encoders to avoid using intra-frame coding whenever possible when encoding blurred regions of an image frame, and a corresponding decoder to decode the encoded image frame.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, methods and apparatus of generating a refined reference frame for inter-frame encoding by applying blur parameters to allow encoding of image frames having blurred regions are disclosed. The methods and apparatus include generating at least one refined reference frame by applying a blur parameter indicative of the at least one blurred region to the at least one reference frame in response to at least one blurred region of the at least one image frame. The blur parameter can be a point spread function of a video recording system, blur modeling algorithms varying in sophistication, or any blur filter parameter as known in the art. The methods and apparatus further include encoding the at least one image frame using the at least one refined reference frame. The methods and apparatus further include identifying at least one blurred region of the at least one image frame by comparing the at least one image frame with at least one reference frame. The methods and apparatus further include determining whether to use one of the at least one reference frame and the at least one refined reference frame, to encode the at least one image frame. The methods and apparatus further include encoding the at least one image frame using the at least one refined reference frame when determined to use the at least one refined reference frame.

Determining whether to use one of the at least one reference frame and the at least one refined reference frame, to encode the at least one image frame, is based on a cost analysis. For example, the typical minimum sum of absolute differences (SAD) process as known in the art works by taking the absolute value of the differences between each pixel in the image frame and the corresponding pixel in the reference frame being used for comparison. These differences are summed to create a simple metric of block similarity. In alternative embodiments, other distortion metrics can be used. The sum of the square of absolute differences (SSAD) and the sum of absolute transformed differences (SATD) can be applied to both the comparison between the image frame and the reference frame and the comparison between the image frame and the refined reference frame. Since there is an additional refined reference frame, unlike conventional encoding methods, an additional comparison process would need to be completed for the frame-refined reference frame pair. If SAD represents an example distortion metric, X represents the number of bits needed to encode the image frame using the reference frame, Y represents the number of bits needed to encode the image frame using the refined reference frame, and $\lambda$ is a normalization factor whose value can be selected depending on the requirements of the encoding system, costs for each pairing can be calculated by the following equations: $Cost_x = SAD + \lambda(X)$ and $Cost_y = SAD + \lambda(Y)$.

Generally, the minimum cost yields the best pairing. Accordingly, determining whether to use the at least one reference frame or the at least one refined reference frame to encode the at least one image frame is based on the lesser associated cost.

Among other advantages, by generating and selecting refined reference frames for inter-frame encoding of image frames having blurred regions, encoders can avoid using intra-frame coding and thus use less bits for encoding, thereby improving the efficiency of the encoding system. Other advantages will be recognized by those of ordinary skill in the art.

Figure 1:
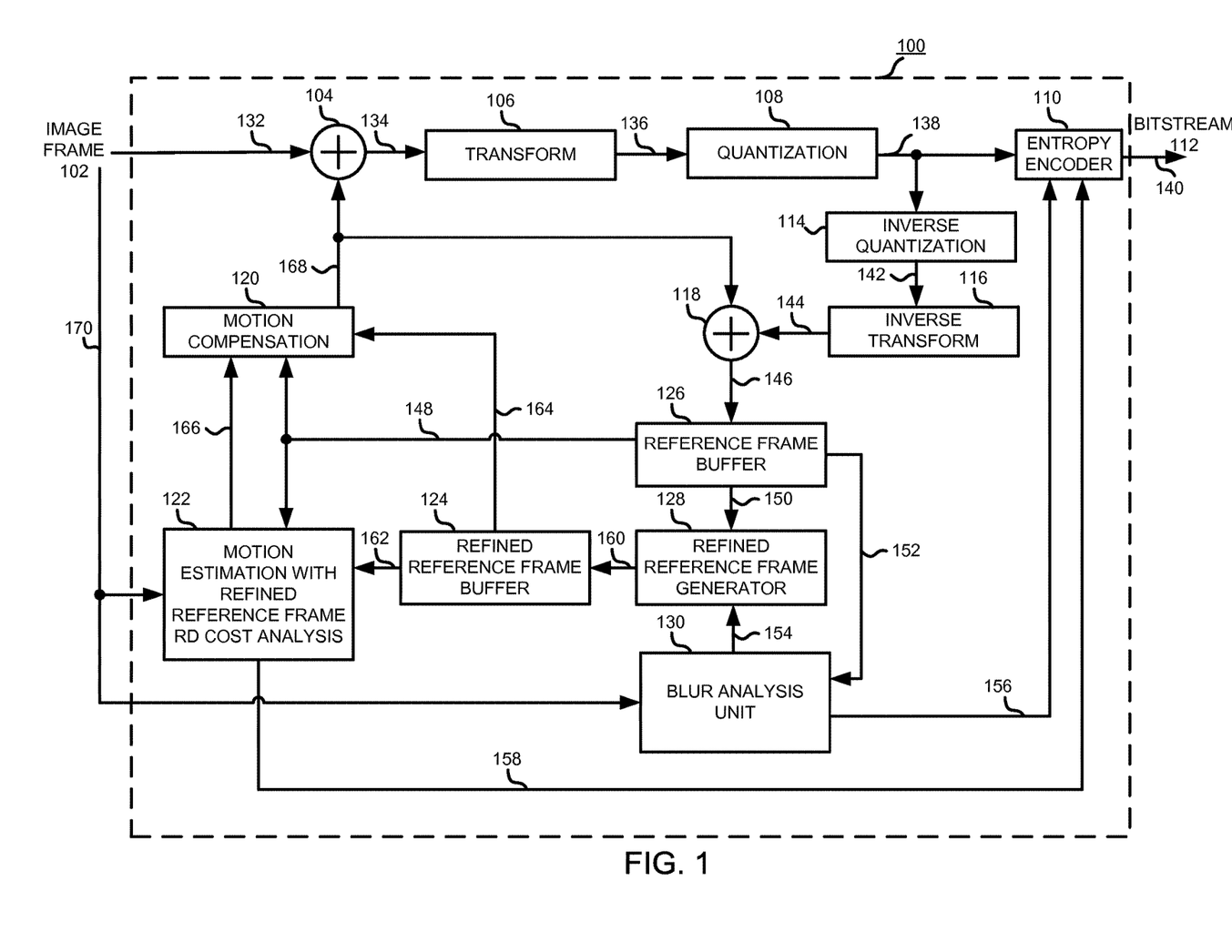
FIG. 1 is a block diagram illustrating one example of an encoding device employing a refined reference frame generator.

FIG. 1 is a block diagram illustrating one example of an encoding device 100 employing a refined reference frame generator 128. In this example, the encoding device 100 receives an input image frame 102 and produces an encoded bitstream 112. The image frame 102 is input to a motion estimation unit 122 via communication link 170 and a blur analysis unit 130 via communication link 170. The output of the motion estimation unit 122 via communication link 166 is input to a motion compensation unit 120. The output of the motion compensation unit 120 via communication link 168 is combined by combiner 104 with the image frame 102 via communication link 132 and output into a transform unit 106, such as a forward discrete cosine transform (fDCT) module, via communication link 134, and a quantization unit 108 via communication link 136. The quantized data is then processed via communication link 138 through an inverse quantization unit 114 and an inverse transform unit 116, such as an inverse discrete cosine transform (iDCT) module, via communication link 142. The inversely transformed data, which is at least one derivative residual macroblock of the image frame 102, is then sent via communication link 144 to the combiner 118 and combined with prediction macroblocks output from the motion compensation unit 120 via communication link 168 to generate at least one reference frame. The at least one reference frame may be stored into a reference frame buffer 126 via communication link 146.

The reference frame buffer 126 provides the at least one reference frame to a refined reference frame generator 128 via communication link 150, the blur analysis unit 130 via communication link 152, the motion compensation unit 120 via communication link 148, and the motion estimation unit 122 via communication link 148. By comparing the image frame 102 with the at least one reference frame, the blur analysis unit 130 identifies at least one blurred region of the image frame 102 if the blurred region exists. The blur analysis unit 130 outputs a blur parameter indicative of the at least one blurred region to the refined reference frame generator 128 via communication link 154. The refined reference frame generator 128 applies the blur parameter to the at least one reference frame provided by the reference frame buffer 126 to generate at least one refined reference frame, which is stored in a refined reference frame buffer 124 via communication link 160. The refined reference frame buffer 124 sends the at least one refined reference frame to the motion estimation unit 122 via communication link 162 and motion compensation unit 120 via communication link 164. The motion estimation unit 122 determine whether to use one of the at least one reference frame and the at least one refined reference frame, to encode the at least one image frame, based on a cost analysis for example, as discussed above. Construction of the at least one reference frame and the at least one refined reference frame ensures that the encoding device 100 and a subsequent decoding device use the same reference frames to encode and decode the macroblocks of the image frame 102.

The entropy encoder 110 receives the output of the quantization unit 108 via communication link 138, the output of the blur analysis unit 130 via communication link 156, and the output of the motion estimation unit 122 via communication link 158 to output the encoded bitstream 112 via communication link 140. The output of the blur analysis unit 130 may be a blur parameter to be inserted into the encoded bitstream 112 for decoding. The output of the motion estimation unit 122 transmitted via communication link 158 may be a blur flag that indicates the selection of one of the at least one reference frame and the at least one refined reference frame. The blur flag may also be inserted into the encoded bitstream 112 for decoding.

The encoding device 100 of FIG. 1 can be implemented in a computing environment that includes multiple central processing unit (CPU) cores, multiple GPU cores, or a hybrid multi-core CPU/GPU system, such as in a laptop computer, a desktop computer, a handheld device, HD television, a server, or any such suitable device. It is understood that any other suitable component may also be included in the encoding device 100. For purposes of illustration only, the encoding device 100 will be described as a computer having a processor such as a CPU. The processor may include one or more processors that may be a host CPU having one or multiple cores, a discrete GPU, an integrated GPU, a general processor (e.g., APU, accelerated processing unit, GPGPU, general-purpose computing on GPU), or any suitable combination thereof or any other suitable processor. The communication links are buses or any other suitable links. Although the encoding device 100 is described with reference to macroblocks, any sized block of pixels can be used.

Figure 2:
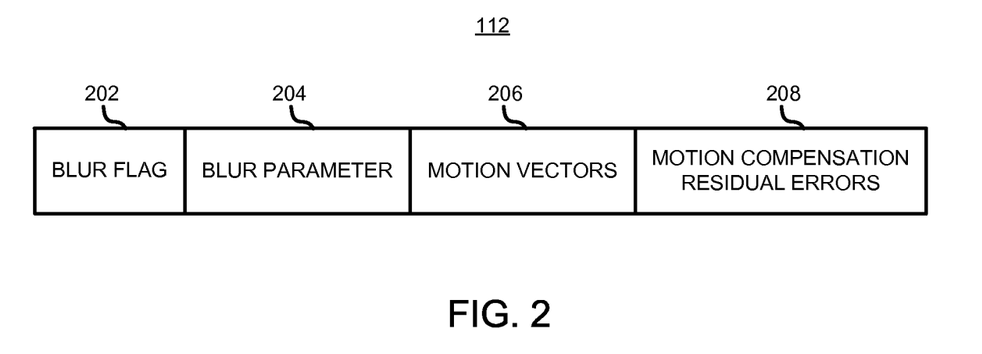
FIG. 2 illustrates an example of a bitstream output from the encoding device.

FIG. 2 illustrates an example of an encoded bitstream 112 output from the encoding device 100. In this example, the encoded bitstream 112 output by the encoding device 100 includes a blur flag 202, a blur parameter 204, motion vectors 206, and motion compensation residual errors 208.

The blur flag 202 generally indicates whether the at least one reference frame or the at least one refined reference frame is determined to encode the at least one image frame. The blur flag 202 is provided by the motion estimation unit 122 to the entropy encoder 110 to output into encoded bitstream 112. The blur flag 202 informs a decoding device to generate at least one reference frame or the at least one refined reference frame, and consequently to decode at least one encoded image frame using the at least one reference frame or the at least one refined reference frame. For example, the blur flag 202 may be 1 bit, with 0 representing that at least one reference frame to encode the at least one image frame, or 1 representing that at least one refined reference frame to encode the at least one image frame. One of ordinary skill in the art will appreciate that the bit size or representation of the blur flag can be implementation-specific.

The blur parameter 204 generally indicates the difference between at least one reference frame and the at least one image frame 102 containing blurred regions, where the difference is applied to a reference frame to generate the refined reference frame. The blur parameter 204 is provided by the blur analysis unit 130 to the entropy encoder 110 to output into the encoded bitstream 112. For example, the blur parameter 204 may be a blur filter parameter or any blur algorithm of varying sophistication, such as a Gaussian model, or a point spread function of a video recording system. As the measure of blur can be a function of the distances between objects and a video recording system, such as a camera, a blur parameter $I'(\eta_x', \eta_y')$ can be estimated for an image $I(\eta_x, \eta_y)$ depending on the point spread function $h(\eta_x, \eta_y)$ of the video recording system, according to the following equation:

$$I'(\eta_x', \eta_y') = \int\int_{-\infty}^{+\infty} I(\eta_x, \eta_y) h(\eta_x' - \eta', \eta_y' - \eta_y) d\eta_x d\eta_y$$
$$= I(\eta_x, \eta_y) \otimes h(\eta_x, \eta_y)$$

where $$\eta_x = x\frac{A_x}{\lambda}, \eta_y = y\frac{A_y}{\lambda},$$

and $A_x$ and $A_y$ are aperture sizes in the horizontal and vertical dimensions, respectively, and $\lambda$ is the wavelength of the source signal output from the video recording system. One of ordinary skill in the art will appreciate that the bit size or representation of the blur parameter can be implementation-specific.

Motion vectors 206 and motion compensation residual errors 208 generally indicate information associated with every macroblock of the image frame 102 as known in the art. Specifically, a macroblock of either the reference frame or the refined reference frame is subtracted from a macroblock of the image frame 102 via the combiner 104 to produce motion compensation residual errors 208. The transform unit 106 and quantization unit 108 subsequently transform codes and quantizes the motion compensation residual errors 208 to provide a set of quantized transform coefficients, which are then entropy coded by the entropy encoder 110. The entropy-coded coefficients, together with the information required to decode the macroblock, such as the type or prediction used, motion vectors, and quantizer values, are output to the encoded bitstream 112. One of ordinary skill in the art will appreciate that the total bit size of the motion vectors 206 and motion compensation residual errors 208 includes the bits necessary to represent the difference between the image frame 102 and one of the at least one reference frame and the at least one refined reference frame and the total bits necessary to encode each motion vector associated with each macroblock.

Figure 3:
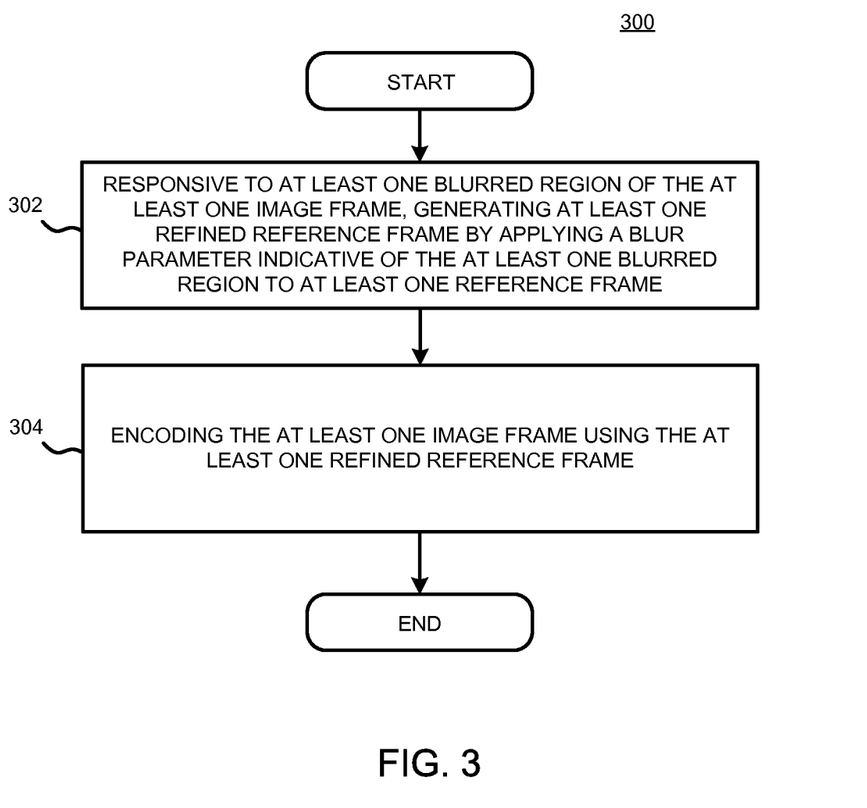
FIG. 3 is a flowchart generally illustrating an example of a method of encoding a blurred region of an image frame.

FIG. 3 is a flowchart generally illustrating an example of a method of encoding a blurred region of an image frame 102. Particularly, FIG. 3 may be performed by any suitable executing software module, hardware, executing firmware or any suitable combination thereof, such as programmed processors, discrete logic, for example, state machines, to name a few, such as by the encoding device 100 of FIG. 1. As shown in block 302, the method includes generating at least one refined reference frame by applying a blur parameter indicative of the at least one blurred region to at least one reference frame in response to at least one blurred region of the at least one image frame. Block 302 may be performed by the refined reference frame generator 128 of the encoding device 100 of FIG. 1 upon receiving at least one reference frame from the reference frame buffer 126 and a blur parameter from the blur analysis unit 130. The blur analysis unit 130 of the encoding device 100 of FIG. 1 may identify the at least one blurred region of the at least one image frame by comparing the at least one image frame with at least one reference frame. As shown in block 304, the method further includes encoding the at least one image frame 102 using the at least one refined reference frame. The motion estimation unit 122 of the encoding device 100 of FIG. 1 upon receiving the at least one image frame 102, the at least one reference frame from the reference frame buffer 126, and the at least one refined reference frame from the refined reference frame buffer 124, may determine whether to use one of the at least one reference frame and the at least one refined reference frame, to encode the at least one image frame 102.

Figure 4:
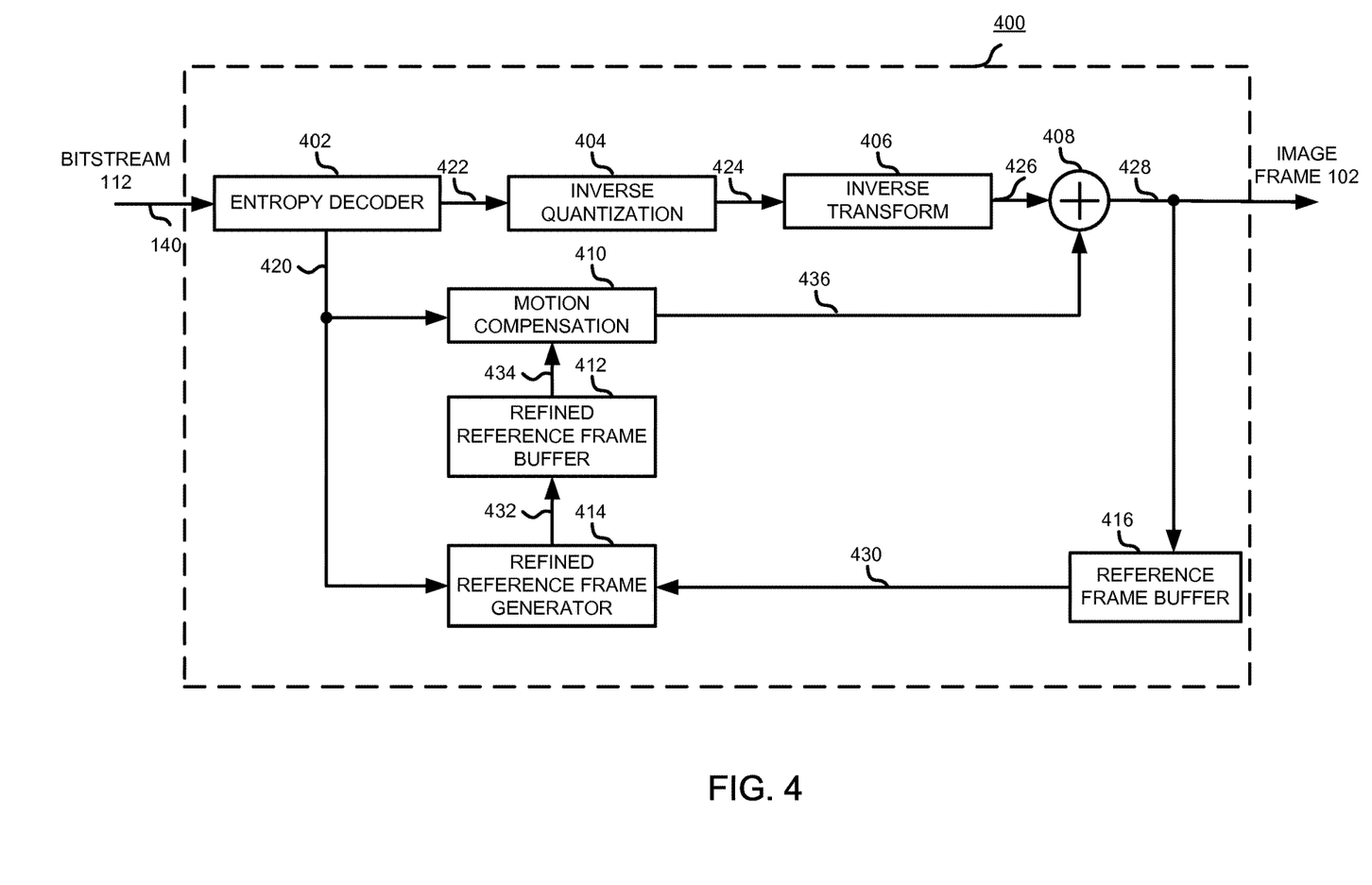
FIG. 4 is a block diagram illustrating one example of a decoding device employing a refined reference frame generator.

FIG. 4 is a block diagram illustrating one example of a decoding device 400 employing a refined reference frame generator 414. In this example, decoding device 400 receives an encoded bitstream 112. The encoded bitstream 112 is input to an entropy decoder 402 via communication link 140. The output of the entropy decoder 402 is input to a motion compensation unit 410 and a refined reference frame generator 414 via communication link 420, and an inverse quantization unit 404 via communication link 422. The inversely quantized data is then sent via communication link 424 to the inverse transform unit 406, such as iDCT. The inversely transformed data, which is at least one derivative residual macroblock of the current image frame identical to that of the encoding device 100, is then sent via communication link 426 to the combiner 408 and combined with the prediction macroblocks output from the motion compensation unit 410 via communication link 436 to create the identical reference frame to that of the encoding device 100. The output of the combiner 408 is input to a reference frame buffer 416 via communication link 428. The output of the reference frame buffer 416 is input to the refined reference frame generator 414 via communication link 430. The output of the refined reference frame generator 414 is input to a refined reference frame buffer 412 via communication link 432. The output of the refined reference frame buffer 412 is input to the motion compensation unit 410 via communication link 434. The combiner 408 outputs the decoded image frame 102 via communication link 428.

The entropy decoder 402 of the decoding device 400 parses the encoded bitstream 112 to obtain the blur flag 202, blur parameter 204, motion vectors 206, and motion compensation residual errors 208 of encoded bitstream 112 of FIG. 2. For example, if the blur flag 202 indicates that the refined reference frame was used to encode the at least one image frame, the refined reference frame generator 414 is capable of deriving the refined reference frame that was used by the encoding device 100 to encode the at least one image frame by applying the blur parameter 204, motion vectors 206, and the motion compensation residual errors 208 to a reference frame provided by the reference frame buffer 416.

The decoding device 100 of FIG. 4 can be implemented in a computing environment that includes multiple CPU cores, multiple GPU cores, or a hybrid multi-core CPU/GPU system, such as in a laptop computer, a desktop computer, a handheld device, HD television, a server, or any such suitable device. It is understood that any other suitable component may also be included in the decoding device 400. For purposes of illustration only, the decoding device 100 will be described as a computer having a processor such as a CPU. The processor may include one or more processors that may be a host CPU having one or multiple cores, a discrete GPU, an integrated GPU, a general processor (e.g., APU or GPGPU), or any suitable combination thereof or any other suitable processor. The communication links are buses or any other suitable links. Although the decoding device 400 is described with reference to macroblocks, any sized block of pixels can be used.

Figure 5:
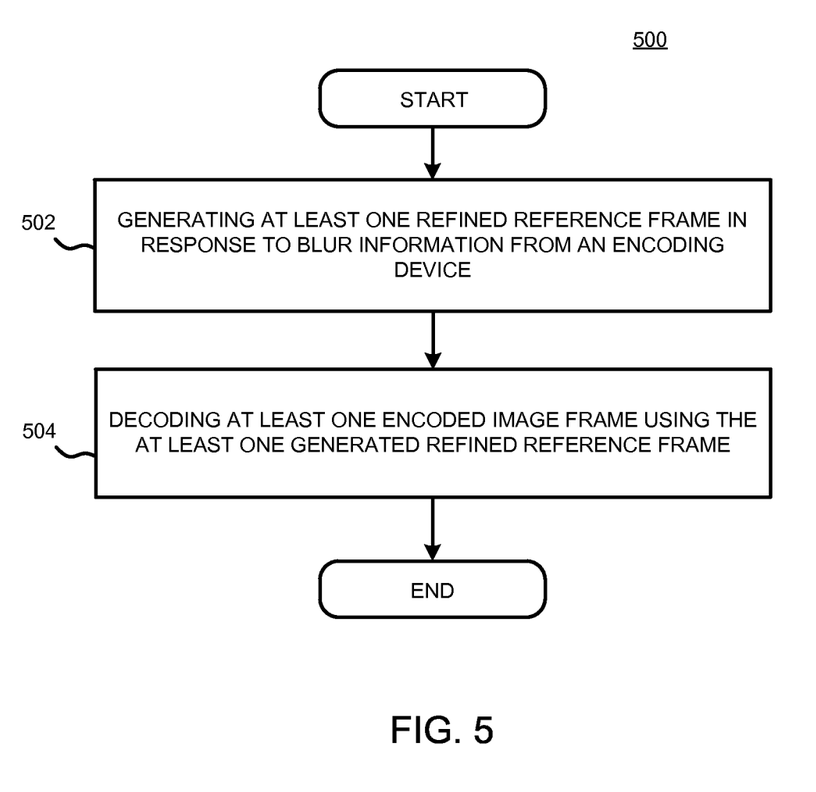
FIG. 5 is a flowchart generally illustrating an example of a method of decoding a blurred region of an image frame.

FIG. 5 is a flowchart generally illustrating an example of a method of decoding a blurred region of an image frame. Particularly, FIG. 5 may be performed by any suitable executing software module, hardware, executing firmware or any suitable combination thereof, such as programmed processors, discrete logic, for example, state machines, to name a few, such as by the decoding device 400 of FIG. 4. As shown in block 502, the method includes generating at least one refined reference frame in response to blur information from an encoding device. Block 502 may be performed by the refined reference frame generator 414 of FIG. 4. As shown in block 504, the method further includes decoding at least one encoded image frame 102 using the at least one generated refined reference frame.

Figure 6:
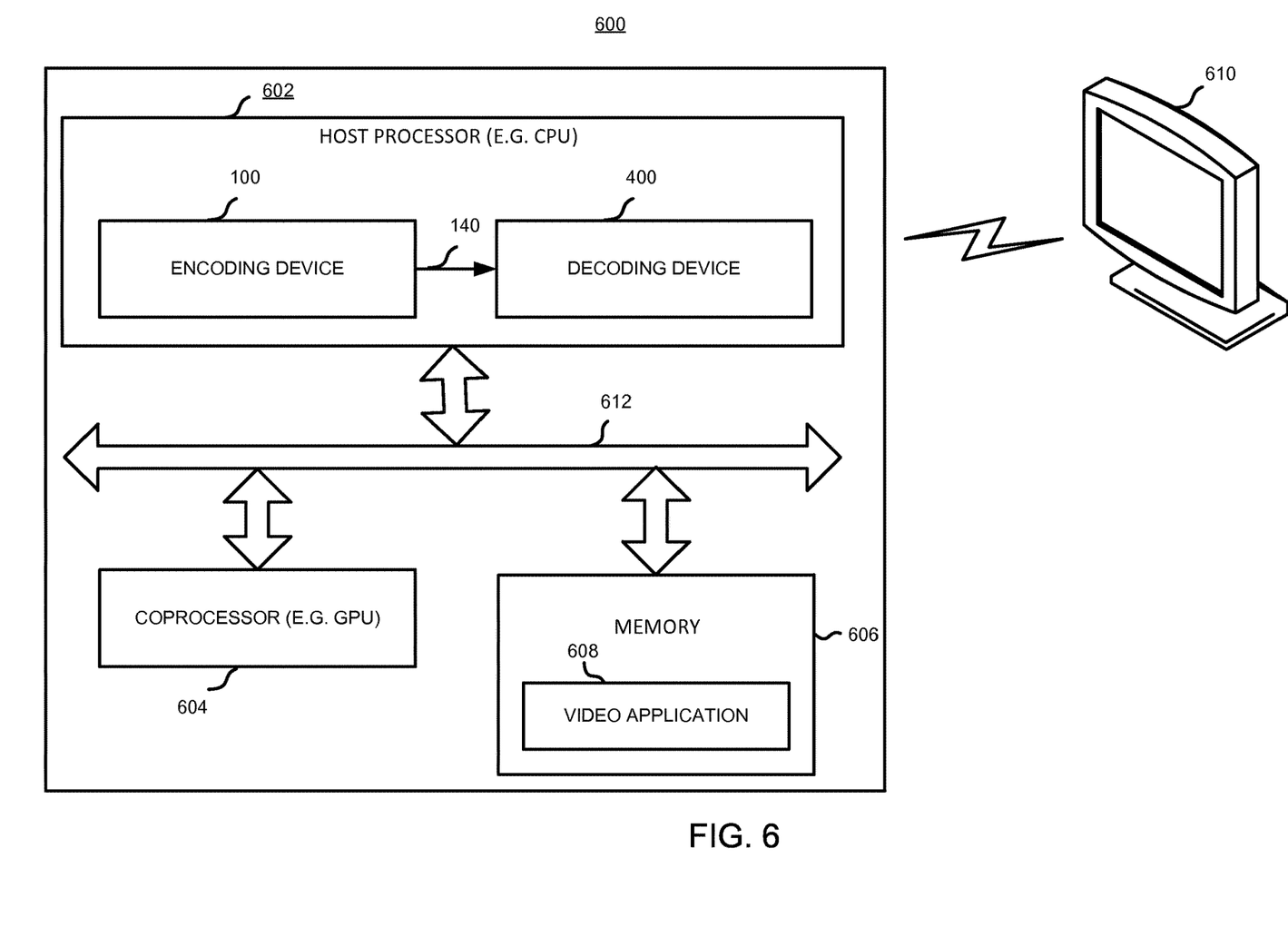
FIG. 6 is a block diagram illustrating one example of the location of the encoding device and the decoding device.

FIG. 6 is a block diagram illustrating one example of the location of the encoding device and the decoding device. The encoding device 100 of FIG. 1 and the decoding device 400 of FIG. 4 can be implemented in a computing environment 600 that includes a host processor 602 (e.g. CPU), a coprocessor 604 (e.g. GPU), and memory 606. A video application 608, which may be stored in memory 608, may provide the at least one image frame 102 to the encoding device 100. The output of the decoding device 400 may be displayed on a display 610, such as a computer monitor, television, or any suitable displaying device. The computing environment 600 may be a laptop computer, a desktop computer, a handheld device, HD television, a server, or any such suitable device. Communication paths interconnecting the various components in FIG. 6, such as path 612, may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method, in an encoding device, for encoding at least one image frame, the method comprising:
generating at least one reference frame based on the at least one image frame;
responsive to at least one blurred region of the at least one image frame, generating at least one refined reference frame by applying a blur parameter to the at least one reference frame;
determining which of either the at least one reference frame or the at least one refined reference frame to use to encode the at least one image frame;
encoding the at least one image frame using the determined one of either the at least one reference frame or the at least one refined reference frame;
inserting the blur parameter into a bitstream for decoding; and
inserting a blur indicator indicative of the determination of using one of the at least one reference frame or the at least one refined reference frame into the bitstream for decoding.

2. The method of claim 1, further comprising identifying the at least one blurred region of the at least one image frame by comparing the at least one image frame with the at least one reference frame.

3. The method of claim 1, wherein the at least one image frame is encoded using the at least one refined reference frame when determined to use the at least one refined reference frame.

4. The method of claim 1, wherein determining which of either one of the at least one reference frame or the at least one refined reference frame to use to encode the at least one image frame is based on a cost analysis.

5. The method of claim 1, wherein the blur parameter comprises a point spread function of a video recording system.

6. The method of claim 1, wherein the blur parameter comprises one or more of a Gaussian model and a blur filter parameter.

7. The method of claim 3, further comprising inserting information associated with at least one macroblock of the at least one image frame into the bitstream for decoding, wherein the information comprises motion vectors and motion compensation residual errors.

8. An encoding device for encoding at least one image frame, the encoding device comprising:
   a blur analysis unit operative to identify at least one blurred region of the at least one image frame by comparing the at least one image frame with at least one reference frame;
   a refined reference frame generator operative to generate at least one refined reference frame by applying a blur parameter to the at least one reference frame; and
   a motion estimation unit operative to determine which of either the at least one reference frame or the at least one refined reference frame to use to encode the at least one image frame,
   an entropy encoder operative to:
      receive the blur parameter provided by the blur analysis unit; and
      insert the blur parameter into a bitstream for decoding;
      receive a blur indicator from the motion estimation unit to indicate the determination of using one of the at least one reference frame or the at least one refined reference frame; and
      insert the blur indicator into the bitstream for decoding; and
   wherein the encoding device encodes the at least one image frame using the determined one of either the at least one reference frame or the at least one refined reference frame as determined from the motion estimation unit.

9. The encoding device of claim 8, wherein the encoding device encodes the at least one image frame using the at least one refined reference frame when determined to use the at least one refined reference frame.

10. The encoding device of claim 8, wherein the motion estimation unit determines which of either one of the at least one reference frame or the at least one refined reference frame to use to encode the at least one image frame based on a cost analysis.

11. The encoding device of claim 8, wherein the blur parameter comprises a blur filter parameter.

12. The encoding device of claim 8, wherein the blur parameter comprises a point spread function of a video recording system.

13. The encoding device of claim 8, wherein the blur parameter comprises a Gaussian model.

14. The encoding device of claim 8, wherein the entropy encoder is further operative to:
   receive information associated with at least one macroblock of the at least one image frame from the motion estimation unit; and
   insert the information into the bitstream for decoding, wherein the information comprises motion vectors and motion compensation residual errors.

15. A method, in a decoding device, for decoding at least one encoded image frame, the method comprising:
   determining which of at least one reference frame or at least one refined reference frame to use in response to blur information from an encoding device to decode the at least one encoded image frame by:
      receiving a blur indicator, a blur parameter, motion vectors, and motion compensation residual errors from the encoding device; and
      generating the at least one reference frame or the at least one refined reference frame based on the blur indicator, the blur parameter, the motion vectors, and the motion compensation residual errors to decode the at least one encoded image frame; and
   decoding the at least one encoded image frame using the determined at least one reference frame or the at least one refined reference frame.

16. The method of claim 15, wherein the blur parameter comprises a blur filter parameter.

17. The method of claim 15, wherein the blur parameter comprises a point spread function of a video recording system.

18. A decoding device for decoding at least one encoded image frame, the decoding device comprising:
   a decoder operative to obtain blur information comprising a blur indicator, a blur parameter, motion vectors, and motion compensation residual errors from an encoding device; and
   a reference frame generator operative to determine which of at least one reference frame or at least one refined reference frame to use in response to the blur information and to generate the at least one reference frame or the at least one refined reference frame based on the blur indicator, the blur parameter, the motion vectors, and the motion compensation residual errors to decode the at least one encoded image frame; and
   logic operative to decode the at least one encoded image frame using the determined at least one reference frame or the at least one refined reference frame.

19. The decoding device of claim 18, wherein the blur parameter comprises a blur filter parameter.

20. The decoding device of claim 18, wherein the blur parameter comprises a point spread function of a video recording system.

* * * * *